US008937466B2

(12) United States Patent
Trattler et al.

(10) Patent No.: US 8,937,466 B2
(45) Date of Patent: Jan. 20, 2015

(54) VOLTAGE-CONVERTER ARRANGEMENT AND METHOD FOR VOLTAGE CONVERSION

(75) Inventors: Peter Trattler, Graz (AT); Karl Georg Waser, Graz (AT); Mario Teufel, Gratwein (AT)

(73) Assignee: AMS AG, Unterpremstätten (AT)

( * ) Notice: Subject to any disclaimer, the term of this patent is extended or adjusted under 35 U.S.C. 154(b) by 208 days.

(21) Appl. No.: 13/019,059

(22) Filed: Feb. 1, 2011

(65) Prior Publication Data
US 2011/0187339 A1 Aug. 4, 2011

(30) Foreign Application Priority Data
Feb. 1, 2010 (DE) .......................... 10 2010 006 437

(51) Int. Cl.
*H02M 3/157* (2006.01)
*H05B 33/08* (2006.01)
*H02M 3/156* (2006.01)

(52) U.S. Cl.
CPC ........... *H02M 3/156* (2013.01); *H05B 33/0815* (2013.01); *Y02B 20/346* (2013.01)
USPC ....................................................... 323/282

(58) Field of Classification Search
USPC ......... 323/282, 283, 284, 285, 208, 229, 277, 323/278, 312, 224, 222, 286; 363/21.01, 363/21.05
See application file for complete search history.

(56) References Cited

U.S. PATENT DOCUMENTS

| | | | |
|---|---|---|---|
| 4,359,650 A * | 11/1982 | Newcomb | 327/111 |
| 2002/0080631 A1 | 6/2002 | Kanouda et al. | |
| 2002/0196006 A1* | 12/2002 | Hwang | 323/288 |
| 2003/0076880 A1 | 4/2003 | Yang et al. | |
| 2003/0169026 A1 | 9/2003 | Kanakubo et al. | |
| 2004/0051382 A1 | 3/2004 | Gavrila et al. | |
| 2004/0257048 A1 | 12/2004 | Chagny | |
| 2005/0213358 A1 | 9/2005 | Feldtkeller | |
| 2005/0237001 A1 | 10/2005 | Hayafuji | |

(Continued)

FOREIGN PATENT DOCUMENTS

| | | |
|---|---|---|
| DE | 103 22 870 | 12/2004 |
| DE | 10 2008 011 706 | 9/2009 |

OTHER PUBLICATIONS

"MC44603—Mixed Frequency Mode Greenline™ PWM Controller: Fixed Frequency, Variable Frequency, Standby Mode", Datasheet, ©Motorola, Inc. 1999, Rev. 1.

*Primary Examiner* — Gary L Laxton
*Assistant Examiner* — Trinh Dang
(74) *Attorney, Agent, or Firm* — McDermott Will & Emery LLP (57) ABSTRACT

A voltage-converter arrangement comprises an arrangement input (11) for the supply of an input voltage (VIN), an arrangement output (12) for the provision of an output voltage (VOUT), a voltage converter (13) that is coupled on the input side to the arrangement input (11) and on the output side to the arrangement output (12), and a control device (20) with a control output (21). The control output (21) is coupled to the voltage converter (13). A control signal (SW) can be picked up at the control output (21). The control device (20) is designed to switch the frequency (f) of the control signal (SW) between values from a number N of predetermined, discrete frequency values. The voltage converter (13) is designed to convert the input voltage (VIN) into the output voltage (VOUT) as a function of the control signal (SW).

17 Claims, 4 Drawing Sheets

(56) References Cited

U.S. PATENT DOCUMENTS

| | | |
|---|---|---|
| 2006/0186830 A1 | 8/2006 | Shami et al. |
| 2006/0261798 A1 | 11/2006 | Brassfield et al. |
| 2009/0190377 A1* | 7/2009 | Wang et al. .................. 363/21.1 |
| 2009/0243566 A1 | 10/2009 | Trattler et al. |
| 2009/0276639 A1 | 11/2009 | Saha et al. |
| 2009/0302817 A1* | 12/2009 | Nagai .......................... 323/282 |

* cited by examiner

VOLTAGE-CONVERTER ARRANGEMENT AND METHOD FOR VOLTAGE CONVERSION

RELATED APPLICATIONS

Priority is claimed on German patent application No. 10 2010 006 437.8, filed on Feb. 1, 2010, the entire content of which is hereby incorporated by reference.

The present invention relates to a voltage-converter arrangement, a circuit arrangement with a voltage-converter arrangement, and a method for voltage conversion.

BACKGROUND OF THE INVENTION

Voltage-converter arrangements are used as buck converters, which means as down-converters, as boost converters, which means as up-converters, or as buck-boost converters.

Document DE 102008011706 A1 describes a converter arrangement that is operated at a constant frequency.

Document US 2002/0080631 A1 specifies a voltage-converter arrangement that is operated at a frequency that can assume values from a continuous value range. According to the continuously variable frequency, harmonic waves occur in a plurality of frequency ranges during operation.

SUMMARY OF THE INVENTION

An object of the present invention is to provide a voltage-converter arrangement, a circuit arrangement with a voltage-converter arrangement, and a method for voltage conversion that have harmonic waves at only predetermined frequencies.

In one embodiment, the voltage-converter arrangement comprises an arrangement input, a voltage converter, a control device, and an arrangement output. The voltage converter is coupled on the input side to the arrangement input and on the output side to the arrangement output. One control output of the control device is connected to the voltage converter.

An input voltage is fed to the arrangement input. An output voltage is provided on the arrangement output. A control signal can be picked up at the control output of the control device. Here, the control device is designed to switch the frequency of the control signal between values from a number N of predetermined frequency values. The predetermined frequency values are discrete frequency values. The voltage converter converts the input voltage into the output voltage as a function of the control signal.

Advantageously, the frequency values at which the voltage-converter arrangement is operated are individual, predetermined frequency values. Thus, the frequency values of the harmonic waves are likewise predetermined. The predetermined, discrete frequency values can also named as specified, discrete frequency values.

In one embodiment, a high frequency value is set from the number N of frequency values at a high value for a load current flowing through the arrangement output. The control device sets a low frequency value from the number N of frequency values, as long as the load current has a low value.

In one embodiment, the number N comprises at least two values and at most sixteen values.

In one refinement, the frequency values of the number N of frequency values are from a range between 50 kHz and 40 MHz. Preferably, the frequency values are from a range between 500 kHz and 10 MHz.

In one embodiment, the highest frequency value is higher than the lowest frequency value by at least the factor 2.

In one embodiment, the highest frequency value is less than or equal to sixteen-times the lowest frequency value.

In one embodiment, the frequency values of the number N of frequency values form a series. The number N is at least three. Here, successive elements of the series differ by a predetermined factor X. Preferably, the factor X is a value from a group that comprises the values 2, 4, and 8. Advantageously, the harmonic waves thus lie predominantly at the highest frequency value from the number N of frequency values only at frequency values that also result at the lowest frequency value from the number N of frequency values. For example, a frequency value of 1 MHz has harmonic waves at 1, 2, 3, 4, 5 MHz and so on, as well as a frequency value of 2 MHz has harmonic waves at 2, 4, 6 MHz and so on.

In one embodiment, the voltage-converter arrangement has a clocked operating state in which the control device switches the control signal between values from the number N of frequency values and an inactive operating state. In the inactive operating state, no voltage conversion is performed.

In one embodiment, the control device comprises an oscillator arrangement that is coupled to the control output at an oscillator output. The oscillator arrangement is designed for the provision of an oscillator signal with an oscillator frequency that has a value from the number N of predetermined, discrete frequency values.

In one embodiment, the control device comprises a window comparator. The window comparator is coupled on the output side to a set input of the oscillator arrangement. The window comparator is designed for the comparison of a first and a second reference signal with the output voltage or a measurement signal derived from the output voltage.

In one embodiment, the control device comprises a pulse-width modulator. The pulse-width modulator is connected on the output side to the control output. Thus, the pulse duration of the control signal is adjustable. The control device is designed such that the pulse duration of the control signal is greater than or equal to a minimal value that is a minimal pulse duration. Thus, in each period of the clocked operating state, a voltage conversion is performed. Through the switching to the smallest frequency value from the number N of frequency values, a high efficiency of the energy conversion can be achieved in all operating states and in the transitions between two operating states. The voltage-conversion arrangement has several clocked operating states that differ with respect to the frequency value and the inactive operating state. The pulse-width modulator can be arranged between the oscillator output and the control output.

In one embodiment, the control device comprises an amplifier with an output coupled to the pulse-width modulator. The amplifier provides an analog output signal depending on a comparison of the output signal or the measurement signal with an additional reference signal.

In one embodiment, the voltage converter is realized as a buck converter, as a boost converter, or as a buck-boost converter. In one refinement, the voltage converter can be used selectively as a buck converter or as a buck-boost converter. Alternatively, it can be used selectively as a boost converter or as a buck-boost converter. In turn, it is alternatively constructed so that it is to be used selectively as a buck converter, buck-boost converter, or boost converter.

In one embodiment, a semiconductor body comprises the control device. The control device can be integrated in exactly one semiconductor body.

In one embodiment, a circuit arrangement comprises the voltage-converter arrangement and an electrical load. The electrical load can be a lighting source. The lighting source can comprise a light emitting diode or a xenon flash lamp. The lighting source can comprise more than one light emitting diode or more than one xenon flash. Alternatively, the electrical load could have a motor. The motor could be constructed as a voice coil motor. The electrical load is connected to the arrangement output. The lighting source can be used for generating a light flash or as background lighting. Advantageously, the voltage converter can be operated in the inactive operating state or in the clocked operating state at the smallest frequency from the number N of frequency values outside the time at which the lighting source lights up. Advantageously, the voltage converter arrangement thus generates only exactly defined, easily filterable noise and has high electromagnetic compatibility.

In one embodiment, the output voltage is used as a measurement signal for controlling the control device. The measurement signal is used for selecting the frequency value from the number N of frequency values. In one alternative embodiment, a series circuit that comprises the electrical load and a current source couples the arrangement output to a reference-potential terminal. Here, the current-source voltage that can be picked up across the current source is used as the measurement signal. Alternatively, a signal derived from the current-source voltage can be used as the measurement signal. Thus, advantageously it can be achieved that the voltage drop across the current source is equal to or greater than a minimal value. The control device can switch to a smaller frequency value from the number N of frequency values when the voltage that can be picked up across the current source is significantly greater than the at least one required voltage value. Thus, advantageously the current source is always operated in a predetermined voltage range.

In one embodiment, a method for voltage conversion comprises a feeding of an input voltage. A control signal is generated. Here, the frequency of the control signal has a value from a number N of predetermined, discrete frequency values. The input voltage is converted into an output voltage as a function of the control signal. The frequency of the control signal is switched to a different value from the number N of predetermined, discrete frequency values as a function of the output voltage or of a measurement signal derived from the output voltage.

Advantageously, in the voltage conversion, only harmonic waves at predetermined frequency values appear. Through the selection of the frequency of the control signal from several possible frequency values, an efficient voltage conversion can be reached for different and changing load conditions.

In one embodiment, an oscillator signal is generated such that an oscillator frequency of the oscillator signal has a value from the number N of predetermined, discrete frequency values. The control signal is provided such that the frequency of the control signal is defined by the oscillator frequency of the oscillator signal.

In one embodiment, the oscillator frequency and as a consequence also the frequency of the control signal is set to a different value from the number N of predetermined, discrete frequency values depending on a comparison of the output voltage or the measurement signal with a first and a second reference signal.

In one embodiment, the measurement signal derived from the output voltage is a current-source voltage.

BRIEF DESCRIPTION OF THE DRAWINGS

The invention will be explained in detail below using several embodiments with reference to figures. Components and circuit elements that have identical functions or effects carry identical reference symbols. In so far as circuit parts or components correspond in their function, their description is not repeated in each of the following figures. Shown are.

DETAILED DESCRIPTION OF THE DRAWINGS

Figure 1A:
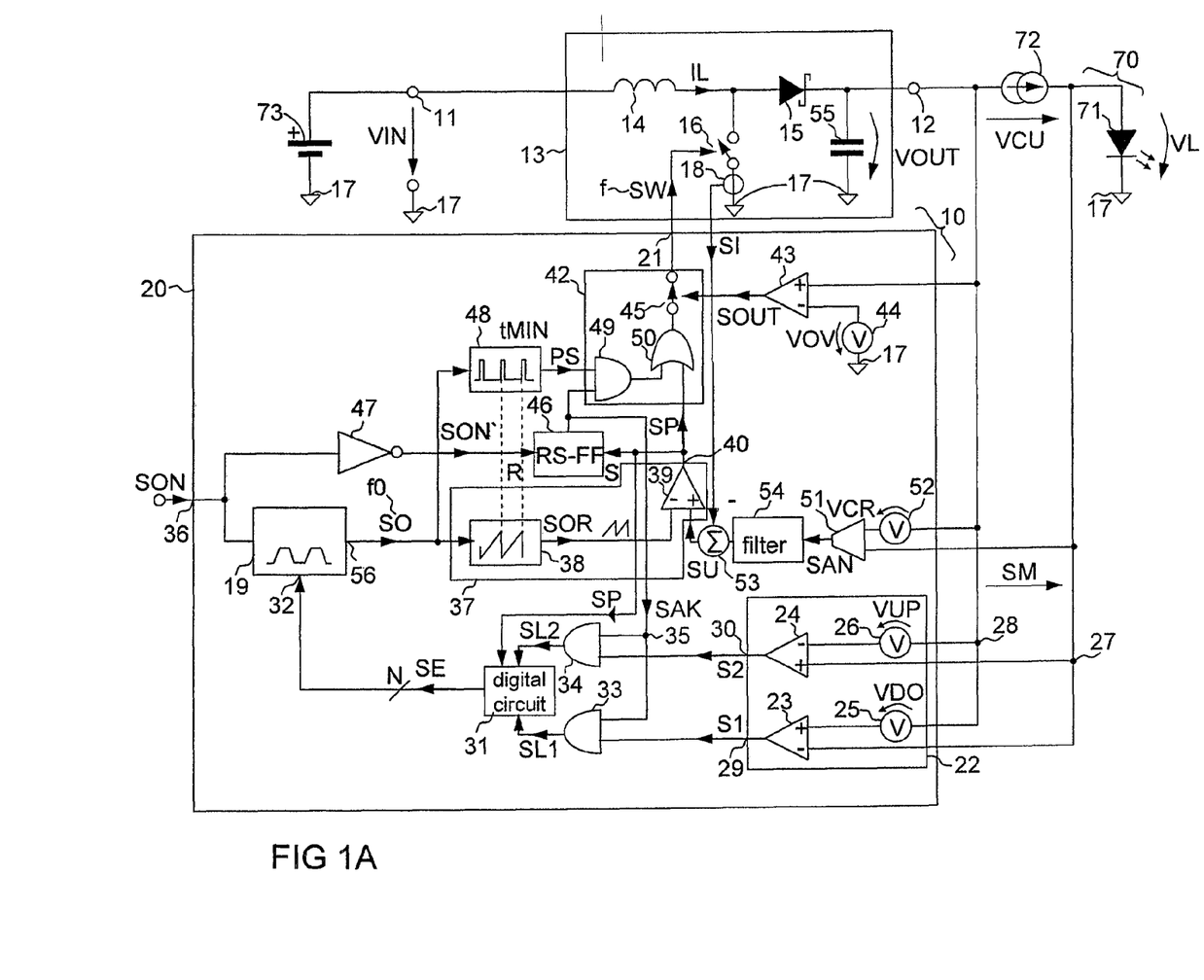
FIGS. 1A and 1B, example embodiments of a voltage-converter arrangement.

FIG. 1A shows an example embodiment of a voltage-converter arrangement. The voltage-converter arrangement 10 comprises an arrangement input 11, an arrangement output 12, and a voltage converter 13. The voltage converter 13 couples the arrangement input 11 to the arrangement output 12. The voltage converter 13 is implemented as a boost converter. The voltage converter 13 comprises an inductor 14, a diode 15, and a switch 16. A series circuit comprising the inductor 14 and the diode 15 is wired between the arrangement input 11 and the arrangement output 12. Here, the inductor 14 is attached to the arrangement input 11. The diode 15 is attached to the arrangement output 12. A node between the inductor 14 and the diode 15 is connected via the switch 16 to a reference-potential terminal 17. The diode 15 is realized as a Schottky diode. In addition, the voltage converter 13 comprises a current sensor 18. The current sensor 18 is arranged in series with respect to the switch 16.

The voltage-converter arrangement 10 further has a control device 20 with a control output 21. The control output 21 is attached to the voltage converter 13. The control output 21 is coupled to a control input of the switch 16. The control device 20 comprises an oscillator arrangement 19. The oscillator arrangement 19 is coupled on one oscillator output 56 to the control output 21. The control device 20 further has a window comparator 22. The window comparator 22 comprises a first and a second comparator 23, 24. A first node 27 is connected to a first input of the first comparator 23 and a first input of the second comparator 24. A second node 28 is connected via a first reference-voltage source 25 to the second input of the first comparator 23 and via a second reference-voltage source 26 to a second input of the second comparator 25. The window comparator 22 has a first and a second window-comparator output 29, 30. The first and the second window comparator outputs 29, 30 are connected via a digital circuit 31 to a setting input 32 of the oscillator arrangement 19. The control device 20 has a first and a second logic gate 33, 34. One output of the first comparator 23 is attached to the first window-comparator output 29. One output of the second comparator 24 is attached to the second window-comparator output 30. The first window-comparator output 29 is attached to a first terminal of the first logic gate 33. Accordingly, the second window-comparator output 30 is attached to a first input of the second logic gate 34. A second input of the first logic gate 33 and a second input of the second logic gate 34 are connected to an activity-signal terminal 35. The first and the second logic gates 33, 34 are attached on the output side to the digital circuit 31. The first and the second logic gates 33, 34 are realized as AND gates. The digital circuit 31 is connected to the setting input 32 via a bus connection comprising a number N of lines. An activation input 36 of the control device 20 is connected to the oscillator arrangement 19. In one embodiment, the digital circuit 31 comprises an up-down counter. Optionally, the digital circuit additionally comprises a decoder that couples the up-down counter to the setting input 32 of the oscillator arrangement 19. In an alternative embodiment, the digital circuit 31 comprises a shift register. The shift register can be implemented as an up-down shift register.

The control device 20 comprises a pulse-width modulator 37. The pulse-width modulator 37 comprises a sawtooth generator 38 and a pulse-width comparator 39. The oscillator output 56 is connected to an input of the pulse-width modulator 37 and thus to an input of the sawtooth generator 38. The sawtooth generator 38 is connected on the output side to a first input of the pulse-width comparator 39. The pulse-width comparator 39 is connected on the output side to an output 40 of the pulse-width modulator 37. The output 40 of the pulse-width modulator 37 is coupled to the control output 21. A logic circuit 42 of the control device 20 couples the output 40 of the pulse-width modulator 37 to the control output 21. The output 40 of the pulse-width modulator 37 is connected to a different input of the digital circuit 31. In an alternative embodiment (not shown), such a connection is not used.

The control device 20 comprises, in addition, an output voltage comparator 43 that is connected on a first input to the arrangement output 12. A second input of the output voltage comparator 43 is connected to the reference-potential terminal 17 via an output-voltage reference source 44. An output of the output-voltage comparator 43 is attached to a different input of the logic circuit 42. The logic circuit 42 has a switch 45 that is arranged between the output 40 of the pulse-width modulator 37 and the control output 21. The output of the output-voltage comparator 43 is attached to a control input of the switch 45. In addition, the control device 20 has a flip-flop 46. A setting input of the flip-flop 46 is attached to the output 40 of the pulse-width modulator 37. A reset input of the flip-flop 46 is coupled to the activation input 36. An inverter 47 is arranged between the activation input 36 and the reset input of the flip-flop 46. A pulse generator 48 of the control device 20 is attached to the oscillator output 56. An output of the flip-flop 46 is coupled to a different input of the logic circuit 42. For this purpose, the output of the flip-flop 46 and an output of the pulse generator 48 are coupled to the switch 45 via a logic gate 49. The logic gate 49 is realized as an AND gate. The logic circuit 42 comprises another logic gate 50 that is connected on the output side to the control output 21 via the switch 45. The additional logic gate 50 is realized as an OR gate. An output of the logic gate 49 and the output 40 of the pulse-width modulator 37 are connected to two inputs of the additional logic gate 50.

An amplifier 51 of the control device 20 is connected at a first input to an additional reference-voltage source 52. The first node 27 is connected to a second input of the amplifier 51. The second node 28 is coupled to the first input of the amplifier 51 via the additional reference-voltage source 52. On the output side, the amplifier 51 is coupled to an input of an adder 53. The adder 53 is connected to the pulse-width modulator 37. In addition, the output of the adder 53 is connected to a second input of the pulse-width comparator 39. A second input of the adder 53 is connected to an output of the current sensor 18. A filter 54 is arranged between the amplifier 51 and the adder 53.

A circuit arrangement comprises the voltage-converter arrangement 10 and an electrical load 70. The electrical load 70 comprises a lighting source 71. The lighting source 71 is realized as a light emitting diode. The electrical load 70 further comprises a current source 72 that is wired in series with respect to the lighting source 71. The electrical load 70 connects the arrangement output 12 to the reference-potential terminal 17. A series circuit comprising the lighting source 71 and the current source 72 is arranged between the arrangement output 12 and the reference-potential terminal 17. The first node 27 is connected to a node between the current source 72 and the lighting source 71. The second node 28 is connected to the arrangement output 12. The lighting source 71 is attached to the reference-potential terminal 17. The current source 72 is attached, in contrast, to the arrangement output 12. The current source 72 couples the arrangement output 12 to the first node 27. Thus, the current source 72 is arranged between the second node 28 and the first node 27. The voltage converter 13 further comprises a capacitor 55 that connects the arrangement output 12 to the reference-potential terminal 17. The circuit arrangement has a voltage source 73 that is wired between the arrangement input 11 and the reference-potential terminal 17. The voltage source 73 is realized as a battery.

An input voltage VIN is applied between the arrangement input 11 and the reference-potential terminal 17. The input voltage VIN is provided by the voltage source 73. An output voltage VOUT can be picked up between the arrangement output 12 and the reference-potential terminal 17. The voltage converter 13 converts the input voltage VIN into the output voltage VOUT. A control signal SW is output on the control output 21. The control signal SW is fed to the switch 16. If the control signal SW sets the switch 16 into a closed operating state, then a coil current IL flows from the arrangement input 11 via the inductor 14 and the switch 16 to the reference-potential terminal 17. In contrast, if the switch 16 is switched by means of the control signal SW into a blocking operating state, then the coil current IL flows from the arrangement input 11 via the inductor 14 and the diode 15 to the arrangement output 12. The capacitor 55 is loaded by means of the coil current IL. The output voltage VOUT is smoothed by means of the capacitor 55. The output voltage VOUT drops across the electrical load 70. A lighting-source voltage VL can be picked up across the lighting source 71. Accordingly, a current-source voltage VCU can be picked up across the current source 72. The output voltage VOUT is thus the sum from the lighting-source voltage VL and the current-source voltage VCU.

The current-source voltage VCU is used as the measurement signal SM that is supplied to the voltage-converter arrangement 10. The current-source voltage VCU thus drops between the second node 28 and the first node 27. The window comparator 22 compares the measurement signal SM with a first and a second reference signal VDO, VUP. The first reference signal VDO is provided by the first reference-voltage source 25. Correspondingly, the second reference signal VUP is output by the second reference-voltage source 26. The first comparator 23 thus compares the first reference signal VDO with the measurement signal SM. Analogously, the second comparator 25 compares the second reference signal VUP with the measurement signal SM. On the first and on the second window-comparator outputs, a first and a second signal S1, S2 are output. The first signal S1 then has the logical value 1 when the measurement signal SM is greater than the first reference signal VDO. Furthermore, the second signal S2 has the logical value 1 when the measurement signal SM is less than the second reference signal VUP. Otherwise, the first and the second signal S1, S2 have the logical value 0. For a logical value 1 of the second signal S2, the current-source voltage VCU is thus too low. In contrast, for a logical 1 of the first signal S1, the current-source voltage VCU is higher than required. An activity signal SAK can be picked up on the activity-signal terminal 35.

The first and the second logic gates 33, 34 provide a first and second logic signal SL1, SL2, respectively. If the activity signal SAK and the first signal 51 have the logical value 1, then the first logic signal SL1 has the logical value 1. Correspondingly, the second logic signal SL2 has the logical value 1 as long as the activity signal SAK and the second signal S2 both have the logical value 1. The logic circuit 31 provides, as a function of the first and the second logic signal SL1, SL2, a set signal SE that is supplied to the set input 32 of the oscillator arrangement 19.

The oscillator arrangement 19 provides an oscillator signal SO. The oscillator arrangement 19 is designed to output the oscillator signal SO with an oscillator frequency f0 that can assume alternating, different, discrete frequency values. The oscillator arrangement 19 can provide the oscillator signal SO with the number N of frequency values. On the activation input 36, an activation signal SON is applied. The activation signal SON is supplied to the oscillator arrangement 19. The oscillator arrangement 19 provides the oscillator signal SO as a function of the activation signal SON. The set signal SE defines the frequency value of the oscillator frequency f0 of the oscillator signal SO. The set signal SE is realized as a bus signal and comprises the number N of signals.

The oscillator signal SO is supplied to the pulse-width modulator 37. The sawtooth generator 38 generates a sawtooth signal SOR as a function of the oscillator signal SO. The current sensor 18 outputs a current signal SI that is a function of the value of the current flowing through the switch 16. By means of the current signal SI, a so-called slope compensation can be performed. The measurement signal SM is supplied to the amplifier 51. The amplifier 51 provides an analog output signal SAN as a function of a comparison of the measurement signal SM and an additional reference signal VCR. The amplifier can be implemented as an operational transconductance amplifier, abbreviated OTA. The additional reference signal VCR is output by the additional reference voltage source 52. The analog output signal SAN is filtered by means of the filter 54 and supplied to the first input of the adder 53. The filter 54 can be realized as a low pass filter. The current signal SI is supplied to the second input of the adder 53. The adder 53 adds the signals applied to the first and second inputs, namely the filtered analog output signal SAN and the current signal SI. An adder signal SU on the output of the adder SU is supplied to the pulse-width comparator 39. The pulse-width comparator 39 thus compares the sawtooth signal SOR with the adder signal SU. A pulse-width signal SP can be picked up on the output 40 of the pulse-width modulator 37. The pulse-width signal SP has the logical value 1 when the adder signal SU is greater than the sawtooth signal SOR. In contrast, the pulse-width signal SP has the logical value 0 when the adder signal SU is less than the sawtooth signal SOR. The control signal SW is provided as a function of the pulse-width signal SP. The frequency f of the control signal SW has the frequency value of the oscillator frequency M of the oscillator signal SO.

The output-voltage comparator 43 compares the output voltage VOUT with a reference voltage VOV. The reference voltage VOV is output by the output-voltage reference source 44. An output voltage signal SOUT can be picked up on the output of the output voltage comparator 43. The output-voltage signal SOUT has a logical value 1 when the output voltage VOUT is greater than the reference voltage VOV. The control signal SW is provided as a function of the output voltage signal SOUT. By means of the switch 45 it is achieved that the control signal SW is constant and has no pulses as soon as the output voltage VOUT is greater than the reference voltage VOV. The output-voltage comparator 43 is designed for over-voltage protection. Thus, it is avoided that the output voltage VOUT obtains a to high voltage value, for example in case of a disconnection or failure of the electrical load 70.

The activation signal SON is supplied to the reset input of the flip-flop 46. Through the inverter 47, the activation signal SON is inverted, so that an inverted activation signal SON' is supplied to the reset input. The activity signal SAK can be picked up on the output of the flip-flop 46 and thus on the activity-signal terminal 35. If the activation signal SON thus has the logical value 1, then the logical value 0 is applied on the reset input of the flip-flop 46, so that no reset process is triggered. The activity signal SAK has the value 1 in this case. In contrast, if the activation signal SON has the logical value 0, then the logical value 1 is applied on the reset input, so that the flip-flop 46 is reset and the activity signal SAK assumes the logical value 0. The pulse-width signal SP is supplied to the set input of the flip-flop 46. A logical value 1 of the pulse-width signal SP thus generates a logical value 1 of the activity signal SAK. As soon as the activity signal SAK assumes the logical value 1, the first and the second logic gates 33, 34 switch through the first and the second signal S1, S2. In this case, the digital circuit 31 can change the set frequency value of the oscillator frequency f0. In contrast, if the activity signal SAK has the logical value 0, then the first and the second signals S1, S2 are not switched through and the frequency value of the oscillator frequency f0 remains unchanged. The pulse-width signal SP is supplied, in addition, to the digital circuit 31. The pulse-width signal SP has a pulse-duty factor. The pulse-width signal SP can be used in order to decide whether the highest frequency value is to be set. If the pulse-width signal SP has a very high pulse duty factor, then the highest frequency value is set. If the pulse duty factor is approximately equal to 1, then the set signal SE is selected by means of the coupling of the output 40 to the digital circuit 31 such that the next higher frequency value from the number N of frequency values is set.

In addition, the oscillator signal SO is supplied to the pulse generator 48. The pulse generator 48 is designed to output a pulse signal PS with pulses with a predetermined minimal pulse duration tMIN. The predetermined minimal pulse duration tMIN defines the minimal pulse length of a pulse of the control signal SW. The pulse generator 48 outputs the pulses with a logical value 1 at the beginning of each period. The pulse signal PS of the pulse generator 48 and the activity signal SAK are supplied to the logic gate 49. The logic gate 49 has an AND function. Only when the activity signal SAK has the logical value 1 is the pulse-width signal SP switched through by the logic gate 49. The control signal SW has pulses whose pulse duration is defined by the pulse-width signal SP and the pulse signal PS. One pulse duration of the control signal SW corresponds to the maximum from the minimal pulse duration tMIN of the pulse signal PS of the pulse generator 48 and the pulse duration of the pulse-width signal SP of the pulse-width modulator 37. Since the pulse duration of the control signal SW cannot be shorter than the minimal pulse duration tMIN, the amplifier 51 and the pulse-width modulator 37 can only control the measurement signal SM in combination with the window comparator 22 and the variable oscillator frequency f0. If the input voltage VIN that can be provided by a battery becomes to low, the duty cycle of the control signal SW cannot balance alone the reduction of the input voltage VIN, thus the oscillator frequency f0 is increased by a step. By means of the switch 45, it is achieved that the control signal SW is constant and has no pulses as soon as the output voltage VOUT is greater than the reference voltage VOV.

The control signal SW thus has pulses when the activation signal SON has a value activating the oscillator arrangement 19 and when, in addition, the output voltage VOUT is less than the reference voltage VOV. The durations of each of the pulses of the control signal SW are defined by the pulse-width signal SP, wherein the minimal pulse duration tMIN is predetermined by the pulse generator 48. The frequency f of the control signal SW and thus the period of the control signal SW is defined by the oscillator frequency f0 of the oscillator signal SO. The oscillator frequency f0 is determined from the number N of frequency values with the help of a feedback loop. The feedback loop comprises the tap for the current-source voltage VCU, the window comparator 22, the first and the second logic gates 33, 34, and the digital circuit 31. If the measurement signal SM is greater than the first reference signal VDO, then the frequency f of the control signal SW is set to a lower frequency value. The control device 20 sets the frequency value of the control signal SW to a higher frequency value from the number N of predetermined frequency values when at least one of the following conditions is fulfilled: the measurement signal SM is smaller than the second reference signal VUP and/or the control device 20 generates pulses in the control signal SW that are longer than the minimal pulse duration tMIN. The difference between the first and the second reference signal VDO, VUP is selected such that oscillations of the oscillator frequency f0 between two different frequency values are avoided. The first reference signal VDO can be higher than the second reference signal VUP.

Advantageously, the frequency value with which a high efficiency of the voltage conversion can be achieved is selected from the number N of frequency values automatically by the voltage converter arrangement 10. Advantageously, the oscillator arrangement 19 can provide the oscillator signal SO exclusively with predetermined frequency values, so that the associated harmonic wave frequencies are likewise predetermined and thus known. Advantageously, filters not shown in FIG. 1A could be realized in the circuit arrangement such that the predetermined harmonic waves can be effectively eliminated. Advantageously, the predetermined frequency values can be defined during the design of the voltage-converter arrangement 10, such that the voltage-converter arrangement 10 generates only harmonic waves that affect other circuit parts not drawn in FIG. 1A as little as possible. The voltage-converter arrangement 10 according to FIG. 1A has a controller that is based on the measurement of the input current or on the current signal SI. In addition, for the control, the phase of the pulse-width signal SP is taken into account. Through the changing of the frequency f, for the predetermined minimal pulse duration tMIN, a high efficiency is also achieved for very low load currents.

Advantageously, in the voltage-converter arrangement 10, only frequency values that are known a priori are used. The frequency values can be, for example, 1 MHz, 2 MHz, and 4 MHz. At a frequency value of 4 MHz and a pulse duration of 35 ns, the pulse duty factor equals 15%. In contrast, the pulse duty factor equals 3.5% at a frequency value of 1 MHz and a pulse duration of 35 ns. A switching from the inactive operating state to the clocked operating state means at the frequency value 4 MHz, a switching from a pulse duty factor of 0-15%. In contrast, the switching at a frequency value of 1 MHz means the switching of the pulse duty factor from 0% to only 3.5%. Thus, through the selection of the different frequency values just in the transition range between the inactive operating state and the clocked operating state, a very high efficiency of energy utilization is achieved.

In a not-shown, alternative embodiment, the diode 15 can be implemented as a wired transistor. The transistor is here used as a switch.

In a not-shown, alternative embodiment, the measurement signal SM is identical with the output voltage VOUT. Here, the first node 27 is not connected to the node between the current source 72 and the lighting source 71, but instead to the reference-potential terminal 17. By means of a comparison of the output voltage VOUT with the first and the second reference signal VDO, VUP, it is determined whether the next-higher frequency value or the next-lower frequency value of the oscillator signal SO should be set.

Figure 1B:
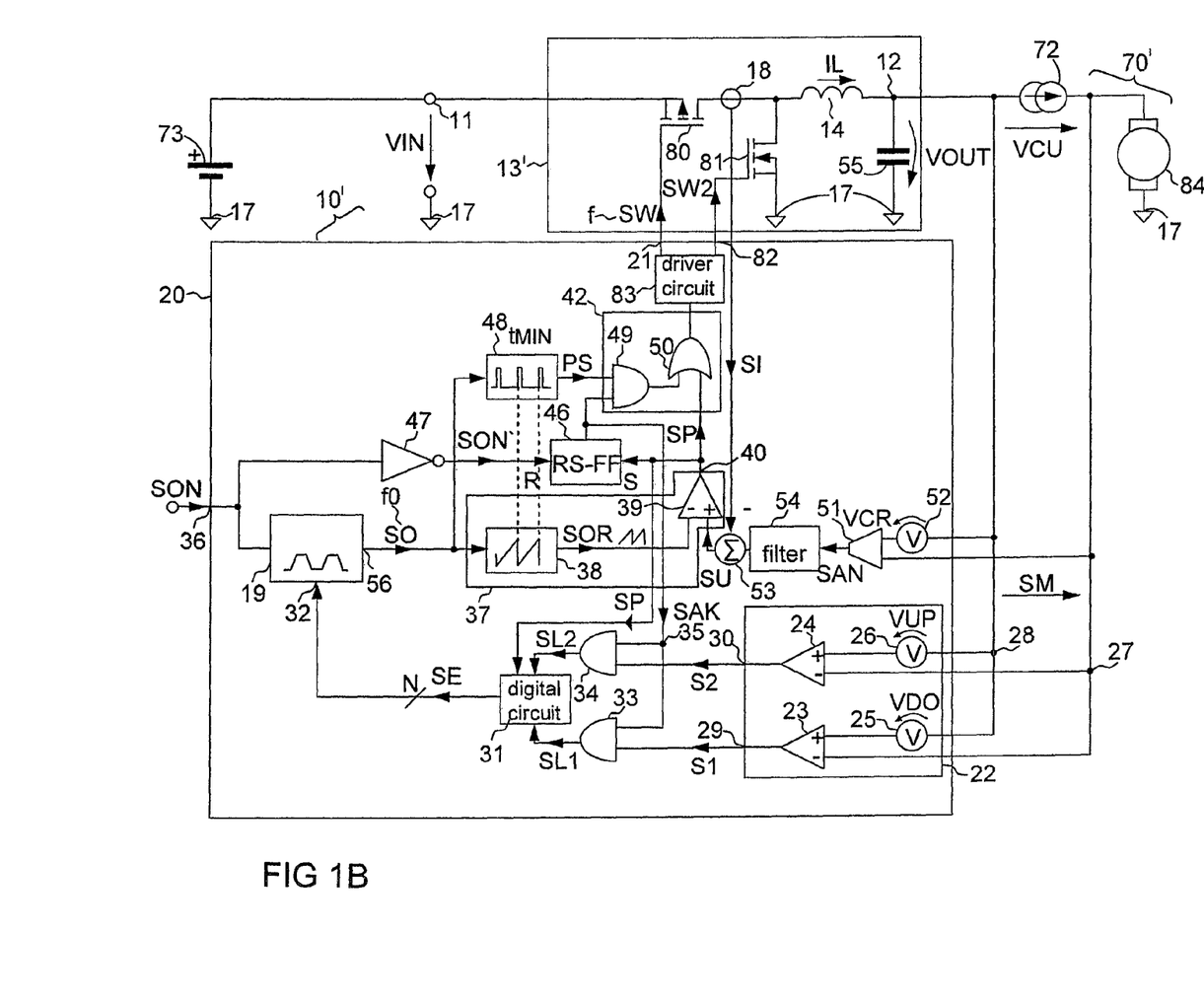

FIG. 1B shows an additional example embodiment of a voltage-converter arrangement. The voltage-converter arrangement 10' according to FIG. 1B is a refinement of the voltage-converter arrangement 10 shown in FIG. 1A. The voltage converter 13' is realized as a buck converter. The voltage converter 13' is thus used for the down conversion of the input voltage VIN into the output voltage VOUT. The voltage converter 13' comprises a first and a second transistor 80, 81 that are arranged in series between the arrangement input 11 and the reference-potential terminal 17. The first transistor 80 is attached to the arrangement input 11. The second transistor 81 is attached to the reference-potential terminal 17. A node between the first and the second transistors 80, 81 is coupled by means of the inductor 14 to the arrangement output 12. The first and the second transistors 80, 81 are realized as field-effect transistors. The two transistors 80, 81 are constructed as metal-oxide semiconductor field-effect transistors. Both transistors 80, 81 are self-blocking. The first transistor 80 is implemented as a p-channel transistor and the second transistor 81 is implemented as an n-channel transistor. The control output 21 is connected to a control terminal of the first transistor 80. An additional control output 82 of the control arrangement 20 is connected to a control terminal of the second transistor 81. The control device 20 comprises a driver circuit 83 that connects the digital circuit 42 to the control output 21 and to the additional control output 82.

The control signal SW is supplied to the first transistor 80. On the additional control output 82, an additional control signal SW2 can be picked up. The additional control signal SW2 is supplied to the second transistor 81. The control signal SW and the additional control signal SW2 are realized such that at most one transistor from a group comprising the first and the second transistors 80, 81 is switched to be conductive at one time. Therefore, because the first and the second transistors 80, 81 are switched to be conductive simultaneously in no operating state, a short circuit between the arrangement input 11 and the reference-potential terminal 17 is avoided. If the first and the second transistors 80, 81 are switched to be blocking by means of the control signal SW and the additional control signal SW2, then the voltage-converter arrangement 10' is in the inactive operating state. If the first transistor 80 is switched to be conductive, then the coil current IL flows from the arrangement input 11 via the first transistor 80 and the inductor 14 to the arrangement output 12. In contrast, if the second transistor 81 is switched to be conductive, then the coil current IL flows through the second transistor 81 and the inductor 14 to the arrangement output 12 due to the energy stored in the inductor 14.

The driver circuit 83 converts the signal at the output of the logic circuit 42 to a suitable level for the first and the second transistors 80, 81. The electrical load 70' comprises the current source 72 and a motor 84. The motor 84 is realized as a moving coil. The motor could be realized as a voice coil motor, abbreviated VCM. The VCM could be used for autofocus applications in a camera. In the configuration according to FIG. 1B, the output-voltage comparator 43, the output-voltage reference source 44, and the control switch 45 are left out.

Advantageously, by means of the voltage converter arrangement 10', an output voltage VOUT is provided that is sufficient for operating the motor 84.

In an alternative, not-shown embodiment, the voltage converter 13' is implemented as a buck-boost voltage converter.

In an alternative embodiment (not shown), the current sensor 18, the current signal SI and the adder 53 are omitted. Thus, filter 54 is directly connected to an input of the pulse-width modulator 37.

Figure 2:
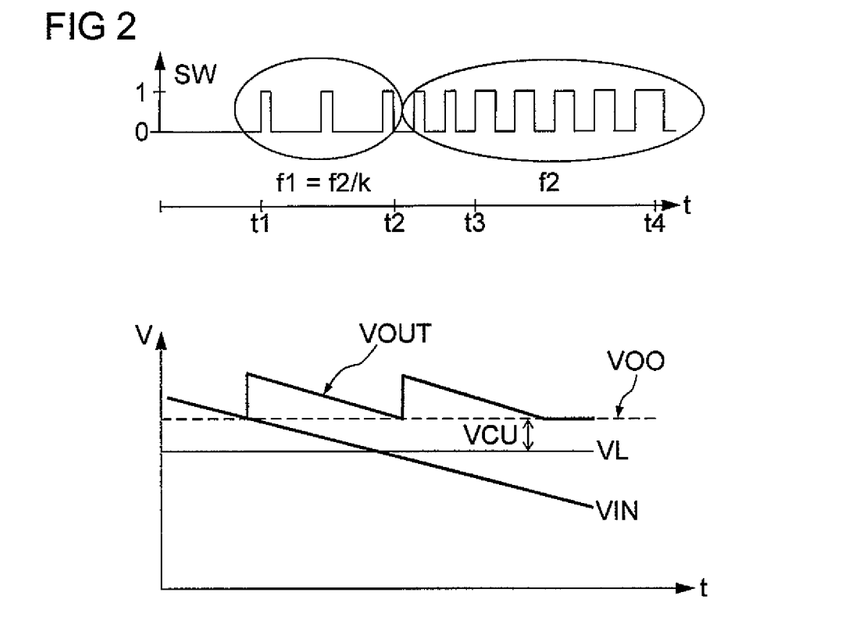
FIG. 2, example signal profiles for a voltage-converter arrangement.

FIG. 2 shows example signal profiles in a voltage-converter arrangement 10, 10' according to FIG. 1A or 1B. In FIG. 2, the profiles of voltages and the control signal SW are shown as a function of the time t. In a time duration between a first and a second time t1, t2, the control signal SW has a low frequency value f1. In a time duration between the second time t2 and a fourth time t4, the control signal SW has a second frequency value f2 that is higher by the factor k than the first frequency value f1. In a time duration between the first time t1 and a third time t3, the pulse duty factor has a low value. In contrast, in a time duration between the third and the fourth time t3, t4, the pulse duty factor has a higher pulse duty factor compared with the preceding time duration.

According to FIG. 2, the input voltage VIN decreases as a function of the time t. This is the case, for example, for a voltage source 73 that is realized as a battery. In the ideal case, the lighting-source voltage VL has a constant value. Corresponding to an optimal current-source voltage VCU for the current sink 72, in the optimal case the output voltage VOUT has a constant value VOO. Due to the switching of the frequencies in the control unit 20, the output voltage VOUT in a voltage-converter arrangement 10, 10' according to the FIGS. 1A and 1B is only slightly above the optimal value for the output voltage VOO. Due to the frequency switching, the voltage-converter arrangement 10, 10' according to FIGS. 1A and 1B has a high energy efficiency compared with conventional voltage-converter arrangements.

Figure 3A:
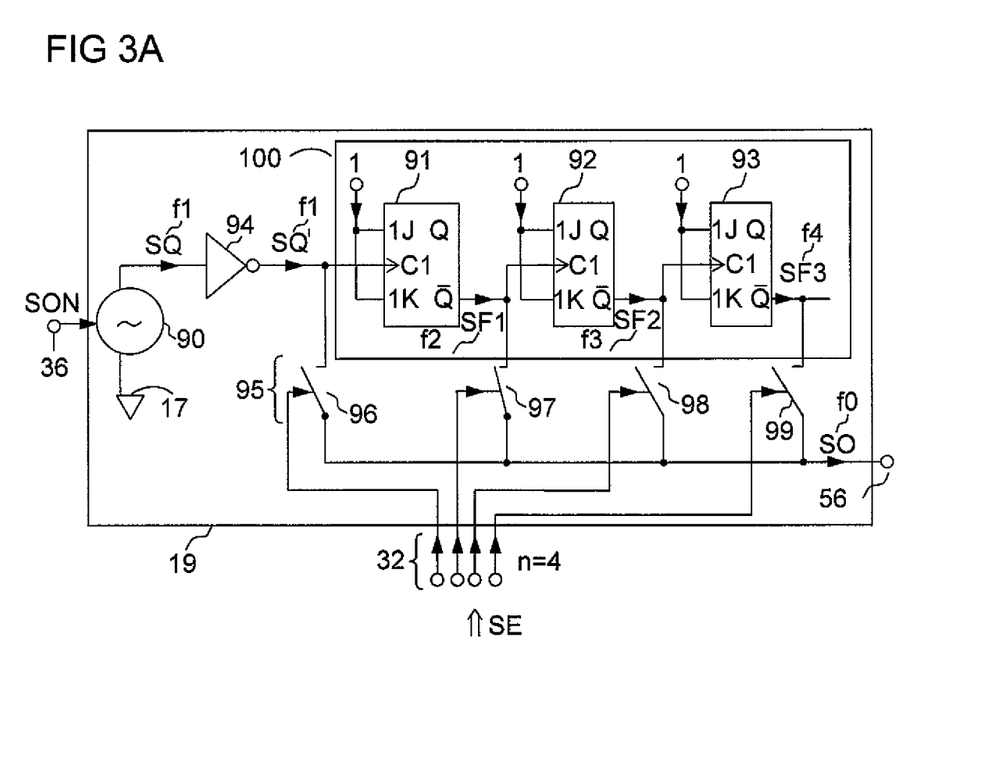
FIGS. 3A and 3B, example embodiments of an oscillator.

FIG. 3A shows an example embodiment of an oscillator arrangement 19 that can be used in the circuit arrangements according to FIGS. 1A and 1B. The oscillator arrangement 19 comprises an oscillator 90 and a frequency divider 100. The oscillator 90 is realized as a piezoelectric quartz oscillator. One input of the oscillator 90 is connected to the activation input 36. One output of the oscillator 90 is connected via the frequency divider 100 to the oscillator output 56. The frequency divider 100 has a chain of flip-flops 91, 92, 93. Here, the oscillator 90 is connected to a clock input C1 of a first flip-flop 91. One output of the first flip-flop 91 is connected to a clock input of the second flip-flop 92. Likewise, one output of the second flip-flop 92 is connected to a clock input of a third flip-flop 93. The first, second, and third flip-flops 91-93 are realized as JK flip-flops. The outputs of the first, the second, and the third flip-flops 91, 92, 93 are designated as inverted outputs Q'. An inverter 94 is wired between the oscillator 90 and the clock input C1 of the first flip-flop 91.

The clock inputs C1 of the first, the second, and the third flip-flops 91, 92, 93, as well as the output Q' of the third flip-flop 93 are connected to the oscillator output 56 via a multiplexer 95. For this purpose, the multiplexer 95 has a first to a fourth switch 96-99. The set input 32 of the oscillator arrangement 19 is attached to the control input of the multiplexer 95. Thus, the set input 32 is coupled to the control inputs of the first, the second, the third, and the fourth switch 96-99.

The oscillator 90 provides an oscillator signal SQ. The oscillator signal SQ is brought into a rectangular shape by means of the inverter 94. The rectangular oscillator signal SQ' is supplied as a clock signal to the clock input C1 of the first flip-flop 91. The oscillator signal SQ or the rectangular oscillator signal SQ' have a first frequency value f1. The first flip-flop 91 outputs the first flip-flop signal SF1 on its output Q'. The first flip-flop signal SF1 has a second frequency value f2. The second frequency value f2 equals half the first frequency value f1. Likewise, the second and the third flip-flop 92, 93 provide on their Q' outputs a second or a third flip-flop signal SF2, SF3 with a third or fourth frequency value f3, f4, respectively. The fourth frequency value f4 is half the third frequency value f3 that is, in turn, half the second frequency value f2. By means of the multiplexer 95 and the set signal SE, the oscillator signal SQ' or one of the flip-flop signals SF1, SF2, SF3 is selected and supplied as the oscillator signal SO to the oscillator output 56. Thus, the frequency value fi of the oscillator frequency f0 can be defined according to the following equation:

$$fi = \frac{f1}{2^{i-1}},$$

where i runs through the numbers 1 up to the number N. In the example according to FIG. 3A, the number N has the value 4. Advantageously, by means of the flip-flops 91, 92, 93, an exact division of the first frequency value f1 of the oscillator signal SQ is performed.

Figure 3B:
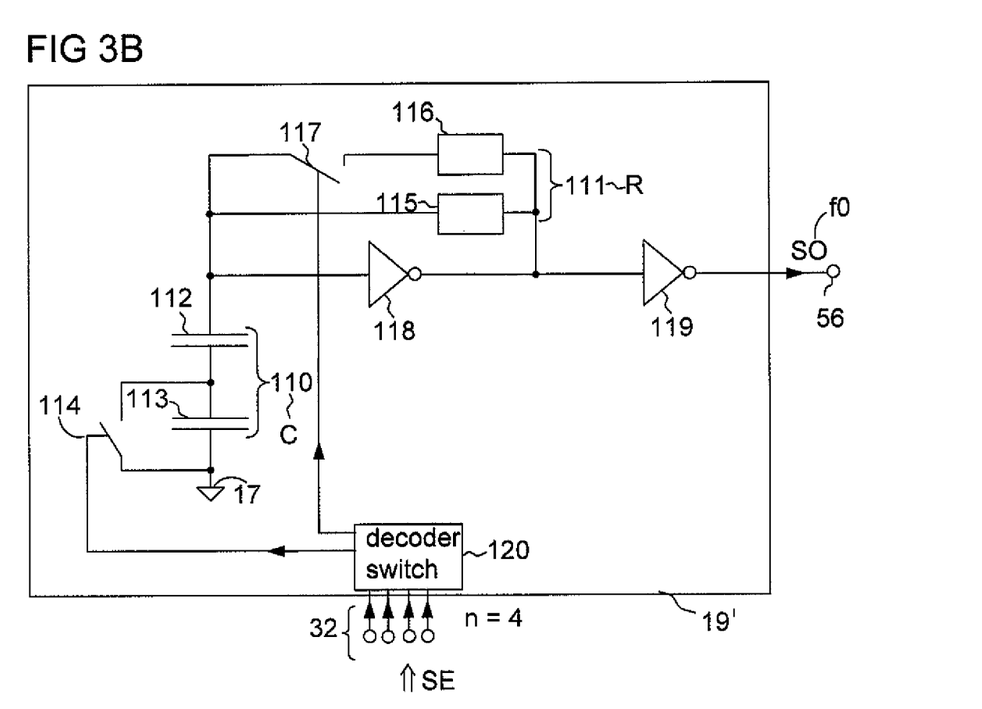

FIG. 3B shows an additional example embodiment of an oscillator arrangement 19' that can be used in one of the voltage-converter arrangements according to FIGS. 1A and 1B. The oscillator arrangement 19' is realized as an RC oscillator. The oscillator arrangement 19' has a switchable capacitor arrangement 110 and a switchable resistor arrangement 111. The switchable capacitor arrangement 110 has an adjustable capacitance value C. The switchable capacitor arrangement 110 comprises a first capacitor 112 and a parallel circuit comprising a second capacitor 113 and a first switch 114 that is wired in series to the first capacitor 112. The switchable resistor arrangement 111 has a resistance value R. The switchable resistor arrangement 111 comprises a first resistor 115 as well as a series circuit made from a second resistor 116 and a second switch 117, wherein the series circuit is wired in parallel to the first resistor 115. In addition, the oscillator arrangement 19' comprises an amplifying element 118. The amplifying element 118 is realized as a first inverter. One output of the amplifying element 118 is connected to one input of the amplifying element 118 via the switchable resistor arrangement 111. The input of the amplifying element 118 is connected to the reference-potential terminal 17 via the switchable capacitor arrangement 110. The output of the amplifying element 118 is coupled to the oscillator output 56. A second inverter 119 connects the output of the amplifying element 118 to the oscillator output 56. A decoder circuit 120 of the oscillator arrangement 19' couples the set input 32 to the control terminals of the first and the second switches 114, 117.

The oscillator frequency f0 of the oscillator signal SO can be calculated approximately according to the following equation:

$$fO = \frac{K}{R \cdot C},$$

where C is the set capacitance value of the switchable capacitor arrangement 110, R is the set resistance value of the switchable resistor arrangement 111, and K is a proportionality factor. Corresponding to the set signal SE, the switch positions of the first and the second switch 114, 117 are selected and the capacitance value C as well as the resistance value R are set. Thus, two different capacitance values C and two different resistance values R and thus four different frequency values of the oscillator frequency f0 can be set.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

We claim:

1. A voltage-converter arrangement comprising:
   an arrangement input for the supply of an input voltage;
   an arrangement output for the provision of an output voltage;
   a voltage converter that is coupled on the input side to the arrangement input and on the output side to the arrangement output; and
   a control device comprising an oscillator arrangement, a window comparator and a control output that is coupled to the voltage converter and at which a control signal can be picked up,
   wherein the control device is configured to switch the frequency of the control signal between values from a number N of predetermined, discrete frequency values,
   wherein the voltage converter is configured to convert the input voltage into the output voltage as a function of the control signal,
   wherein the oscillator arrangement is coupled to the control output at an oscillator output and is configured for providing an oscillator signal with an oscillator frequency that has a value from the number N of predetermined, discrete frequency values,
   wherein the window comparator is coupled on the output side to a set input of the oscillator arrangement,
   wherein the window comparator comprises a first comparator and a second comparator, the first comparator having a first input terminal being connected to a first node and a second input terminal being connected via a first reference-voltage source to generate a first reference signal to a second node, the second comparator having a first input terminal being connected to the first node and a second input terminal being connected via a second reference-voltage source to generate a second reference signal to the second node,
   wherein the first comparator is configured to compare the first reference signal with the measurement signal and the second comparator is configured to compare the second reference signal with the measurement signal dropping between the first node and the second node,
   wherein each of the first node and the second node is coupled to the arrangement output,
   wherein a current source is arranged between the second node and the first node, and
   wherein a current-source voltage can be picked up across the current source and is used as the measurement signal.

2. The voltage-converter arrangement according to claim 1, wherein the number N is at least two and at most sixteen.

3. The voltage-converter arrangement according to claim 1, wherein the frequency values are from a range between 50 kHz and 40 MHz.

4. The voltage-converter arrangement according to claim 1, wherein the number N equals at least 3 and in a series of the frequency values ordered by their magnitude, two successive frequency values differ by a predetermined factor X.

5. The voltage-converter arrangement according to claim 1, the oscillator arrangement comprising:
   an oscillator and a frequency divider that is connected downstream of the oscillator and is coupled on the output side to the oscillator output, or
   an amplifying element that is coupled on the output side to the oscillator output and comprises at least one arrangement from a group comprising a switchable capacitor arrangement and a switchable resistor arrangement.

6. The voltage-converter arrangement according to claim 1, wherein the control device comprises a first and a second logic gate, wherein the first logic gate includes:
   a first input that is connected to a first window-comparator output of the window comparator,
   a second input to which an activity signal can be supplied, and
   an output that is coupled to the set input, and
   the second logic gate includes
   a first input that is connected to a second window-comparator output of the window comparator,
   a second input to which the activity signal can be supplied, and
   an output that is coupled to the set input.

7. The voltage-converter arrangement according to claim 1, wherein the control device comprises a pulse-width modulator,
   that is coupled at a first input to the oscillator output,
   to which, at a second input, the output voltage or the measurement signal derived from the output voltage is supplied, and
   that is coupled at an output to the control output.

8. The voltage-converter arrangement according to claim 1, wherein the control device is designed to generate, in an active operating state of the voltage-converter arrangement, the control signal such that a pulse duration of the control signal has, in each period, at least one minimal pulse duration, so that, in each period, a voltage conversion is performed.

9. The voltage-converter arrangement according to claim 1, wherein the voltage converter is implemented as at least one converter from a group comprising a buck converter, a boost converter, and a buck-boost converter.

10. The circuit arrangement comprising the voltage-converter arrangement according to claim 1 and an electrical load, wherein the electrical load is coupled to the arrangement output.

11. The voltage-converter arrangement according to claim 4, wherein the predetermined factor X has a value from a group comprising 2, 4, and 8.

12. The circuit arrangement according to claim 10, wherein a series circuit comprising the electrical load and the current source is arranged between the arrangement output and a reference-potential terminal, and the current-source voltage that can be picked up across the current source is supplied as the measurement signal to the window comparator.

13. A method for voltage conversion comprising:
   supplying an input voltage;
   providing an oscillator signal such that an oscillator frequency of the oscillator signal has a value from a number N of predetermined, discrete frequency values;
   generating a control signal, wherein the frequency of the control signal is defined by the oscillator frequency of the oscillator signal;
   converting of the input voltage into an output voltage as a function of the control signal; and
   switching of the oscillator frequency and the frequency of the control signal to a different value from the number N of predetermined, discrete frequency values as a function of a comparison of measurement signal derived from the output voltage with a first reference signal and a second reference signal, the measurement signal dropping between a first and a second node, wherein the first node is connected to a respective first input terminal of each of a first and second comparator of a window comparator and, wherein the second node is connected to a second input terminal of the first comparator of the window comparator via a first reference voltage source to generate the first reference signal and wherein the second node is connected to a second input terminal of the second comparator of the window comparator via a second reference-voltage source to generate the second reference signal, wherein the first comparator is configured to compare the first reference signal with the measurement signal and the second comparator is configured to compare the second reference signal with the measurement signal, wherein the first node and the second node are coupled to an arrangement output of a voltage-converter arrangement to provide the output voltage, wherein a current source is arranged between the second node and the first node, and wherein a current-source voltage can be picked up across the current source and is used as the measurement signal.

14. The method according to claim 13, wherein the oscillator signal is set to the next-lower frequency value of the number N of predetermined, discrete frequency values, if the output voltage or the measurement signal is larger than the first reference signal, and wherein the oscillator signal is set to the next-higher frequency value of the number N of predetermined, discrete frequency values, if the output voltage or the measurement signal is smaller than the second reference signal.

15. The method according to claim 14, wherein the oscillator signal is additionally set to the next-higher frequency value of the number N of predetermined, discrete frequency values, if a pulse in the control signal is longer than a minimal pulse duration.

16. A voltage-converter arrangement comprising:

an arrangement input for the supply of an input voltage;

an arrangement output for the provision of an output voltage;

a voltage converter that is coupled on the input side to the arrangement input and on the output side to the arrangement output;

a control device comprising an oscillator arrangement, a window comparator and a control output that is coupled to the voltage converter and at which a control signal can be picked up; and an electrical load, wherein the control device is configured to switch the frequency of the control signal between values from a number N of predetermined, discrete frequency values, wherein the voltage converter is configured to convert the input voltage into the output voltage as a function of the control signal, wherein the oscillator arrangement is coupled to the control output at an oscillator output and is configured for providing an oscillator signal with an oscillator frequency that has a value from the number N of predetermined, discrete frequency values, wherein the window comparator is coupled on the output side to a set input of the oscillator arrangement, wherein the window comparator comprises a first comparator and a second comparator, the first comparator having a first input terminal being connected to a first node and a second input terminal being connected via a first reference-voltage source to generate a first reference signal to a second node, the second comparator having a first input terminal being connected to the first node and a second input terminal being connected via a second reference-voltage source to generate a second reference signal to the second node, wherein the first comparator is configured to compare the first reference signal with the measurement signal and the second comparator is configured to compare the second reference signal with the measurement signal dropping between the first node and the second node, wherein each of the first node and the second node is coupled to the arrangement output, wherein a current source is arranged between the second node and the first node, wherein a current-source voltage can be picked up across the current source and is used as the measurement signal, and wherein the electrical load comprises a light-emitting diode, and the electrical load is coupled to the arrangement output.

17. A voltage-converter arrangement comprising:

an arrangement input for the supply of an input voltage;

an arrangement output for the provision of an output voltage;

a voltage converter that is coupled on the input side to the arrangement input and on the output side to the arrangement output; and a control device comprising an oscillator arrangement, a window comparator and a control output that is coupled to the voltage converter and at which a control signal can be picked up;

wherein the control device is configured to switch the frequency of the control signal between values from a number N of predetermined, discrete frequency values, wherein the voltage converter is configured to convert the input voltage into the output voltage as a function of the control signal, wherein the oscillator arrangement comprises one of (i) an oscillator and a frequency divider that is connected downstream of the oscillator and is coupled on the output side to the oscillator output, or (ii) an amplifying element that is coupled on the output side to the oscillator output and comprises at least one arrangement from a group comprising a switchable capacitor arrangement and a switchable resistor arrangement, wherein the oscillator arrangement is coupled to the control output at an oscillator output and is configured for providing an oscillator signal with an oscillator frequency that has a value from the number N of predetermined, discrete frequency values, wherein the window comparator is coupled on the output side to a set input of the oscillator arrangement, wherein the window comparator comprises a first comparator and a second comparator, the first comparator having a first input terminal being connected to a first node and a second input terminal being connected via a first reference-voltage source to generate a first reference signal to a second node, the second comparator having a first input terminal being connected to the first node and a second input terminal being connected via a second reference-voltage source to generate a second reference signal to the second node, wherein the first comparator is configured to compare the first reference signal with the measurement signal and the second comparator is configured to compare the second reference signal with the measurement signal dropping between the first node and the second node, wherein each of the first node and the second node is coupled to the arrangement output, wherein a current source is arranged between the second node and the first node, and wherein a current-source voltage can be picked up across the current source and is used as the measurement signal.

\* \* \* \* \*